May 5, 1931.  M. H. DAMERELL  1,803,896
AIR TURBINE
Filed Feb. 4, 1927  2 Sheets-Sheet 1

Inventor
M. H. Damerell
By Attorneys

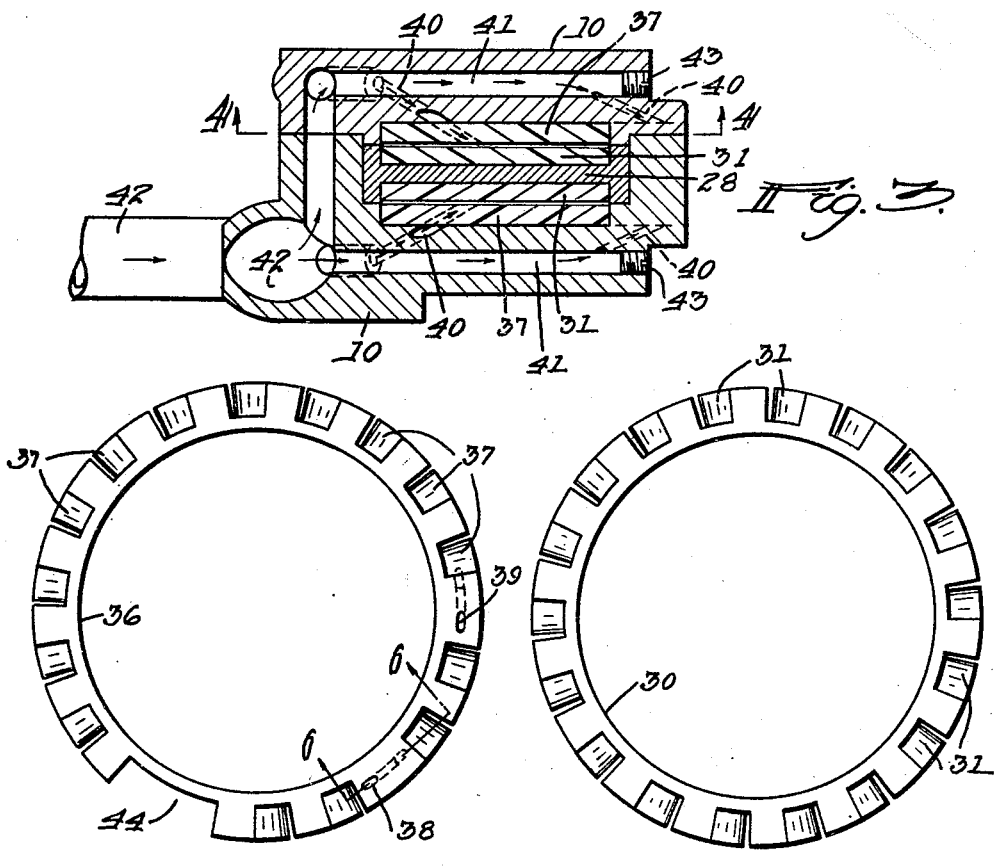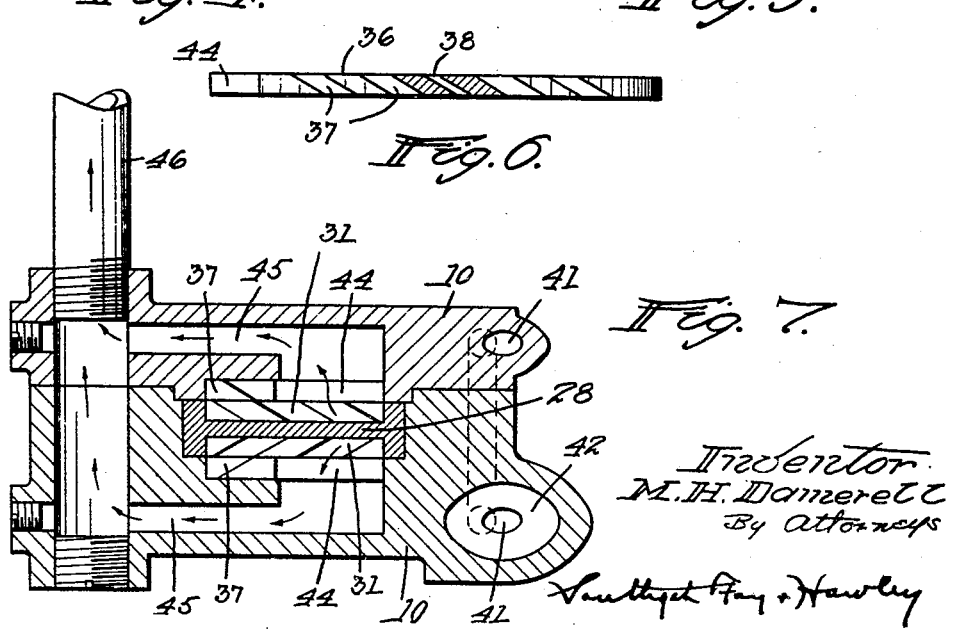

Patented May 5, 1931

1,803,896

UNITED STATES PATENT OFFICE

MARK H. DAMERELL, OF WORCESTER, MASSACHUSETTS, ASSIGNOR TO WYMAN-GORDON COMPANY, OF WORCESTER, MASSACHUSETTS, A CORPORATION OF MASSACHUSETTS

AIR TURBINE

Application filed February 4, 1927. Serial No. 165,971.

This invention relates to an air driven rotary turbine and has for its general object the provision of an air turbine of improved construction, which is adapted to be driven at high speed and which consumes a very small amount of compressed air in its operation.

A further object is to provide an air turbine in which provision is made for a gradual expansion of the air and for a gradual reduction of pressure in the turbine from the inlet to the exhaust of the machine.

Other features of the invention relate to provisions for balancing the air pressure at the two sides of the rotor and for supplying air to the rotor at opposite sides thereof and preferably at separated points on the periphery.

My invention further relates to arrangements and combinations of parts which will be hereinafter set forth and more particularly pointed out in the appended claims.

A preferred form of my invention is shown in the drawings in which

Fig. 3 is a detail sectional view of the inlet connections, taken along the line 3—3 in Fig. 1;

Fig. 4 is a side elevation of one of the casing plates for inlet and exhaust, taken substantially along the line 4—4 in Fig. 3;

Fig. 5 is a side elevation of one of the rotor plates;

Fig. 6 is a detail sectional view, taken along the line 6—6 in Fig. 4; and

Fig. 7 is a detail sectional view of the exhaust connections, taken along the line 7—7 in Fig. 1.

Figure 1:
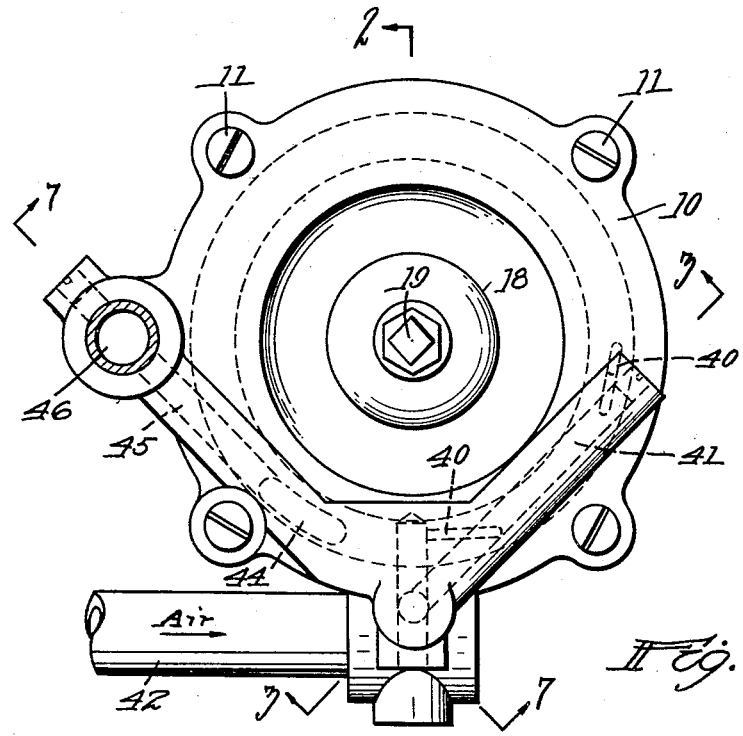
Fig. 1 is a side elevation of my improved turbine.
Figure 2:
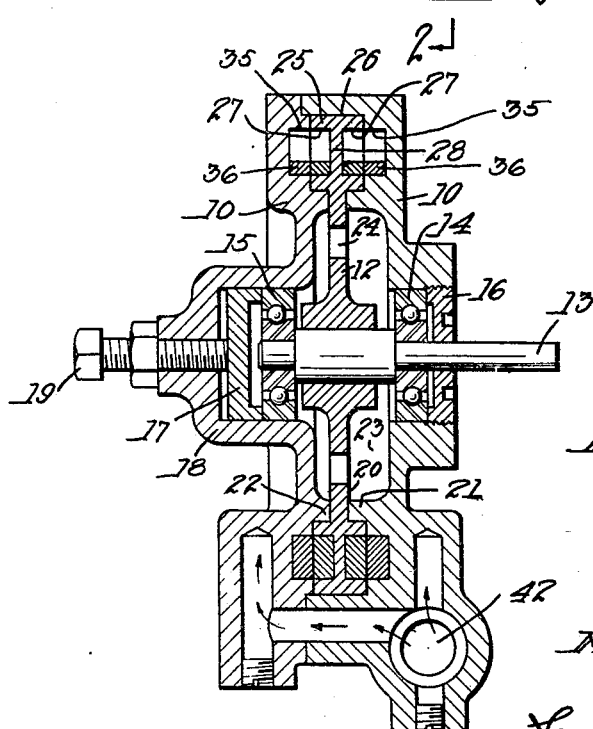
Fig. 2 is a sectional transverse elevation, taken along the line 2—2 in Fig. 1.

Referring to the drawings, my improved turbine comprises a casing 10 preferably formed in two parts, secured together by screws 11 (Fig. 1). A rotor 12 (Fig. 2) is mounted within the casing 10 and is preferably supported upon a shaft 13 having antifriction bearings 14 and 15 at each side of the rotor 12.

The bearings 14 and 15 are slidable in the casing 10 and may be adjusted axially to center the rotor in the casing. For this purpose, a cap 16 is threaded into the casing 10 at one side thereof and engages the outer or non-rotatable member of the bearing. An adjusting member 17 is also slidably mounted in an extension 18 of the casing 10 and engages the outer or non-rotatable member of the bearing 15. An adjusting screw 19 is threaded in the extension 18 and engages the member 17, thus providing means for adjusting the bearing 15 toward the center of the casing.

The threaded cap 16 and adjusting screw 19 thus provide means for moving the rotor axially in either direction, so that it may be accurately aligned in the space provided therefore in the casing 10.

The rotor 12 is provided with a web 20, rotatable between inwardly-extending flanges 21 and 22 of the casing 10. A chamber 23 is thus formed within the casing 10, which chamber receives the hub of the rotor and permits free rotation thereof. Holes 24 are provided in the web 20 of the rotor to equalize the air pressure in the different parts of the chamber 23.

The outer or rim portion 25 of the rotor 12 is of substantial thickness and fits closely within an annular space 26 in the casing 10. The rim portion 25 is provided with a groove or annular recess 27 on each side thereof, separated by a central web 28. A rotor plate 30 (Fig. 5) is fitted into each recess 27, and each plate 30 is provided with a circumferential series of diagonal recesses 31 (Figs. 3 and 5), each recess being inclined forwardly and being terminated at its front inner end by the central web 28.

Each adjacent wall portion of the casing 10 is also provided with an annular recess 35, aligned with the recesses 27 and each recess 35 is fitted with a casing plate 36 (Fig. 4) providing an air inlet and outlet or exhaust. Each casing plate 36 has a circumferential series of diagonal pockets 37, said pockets being rearwardly inclined, and each pocket having its rearward outer end closed by the wall of the casing recess 35.

Two of the pockets 37 in each plate 36 are preferably omitted, to provide space for inlet or nozzle openings 38 and 39, which extend diagonally forward through the plate 36, and which are connected through openings 40 (Fig. 3) to branch inlet passages 41, which in turn are connected to the main inlet pipe 42. The passages 41 may be closed at their outer ends by screws 43 which may be removed for cleaning the passages.

Reference to Fig. 3 will show that in the preferred or balanced form of my turbine, two branch passages 41 are provided, one at each side of the turbine and each connected by openings 40 to the inlet or nozzle openings in the casing plates 36.

At one point on the periphery of each plate 36, an exhaust opening 44 is provided, communicating with branch exhaust passages 45 (Fig. 7) at each side of the turbine, and these branch exhaust passages in turn communicate with an exhaust pipe 46.

The inlet and exhaust passages are so disposed that air entering the pockets of the rotor through the inlet passages 38 or 39 will travel with the rotor around a large portion of the circumference before reaching an exhaust opening 44.

Having described the construction of my improved turbine, the operation and advantages thereof will be readily understood. When air under pressure is supplied through the pipe 42 and branch inlet passages 41 to the inlet or nozzle openings 38 and 39, jets of air under pressure are directed into the recesses 31 of the rotor plates. These jets of air, being directed against the closed front ends of the recesses, cause the rotor to move forward, and such movement cuts off each recess with a charge of compressed air at high pressure pocketed therein. As such a recess moves successively past the expansion recesses 37 of the casing plates, the confined air in the recesses 31 endeavors to expand into the recesses 37 and exerts an opposite or forward pressure on the rotor, which forward pressure is additional to the impact of the air entering through the inlet nozzles. This continued expansion of the confined air into the successive pockets 37 of the casing plates gradually reduces the pressure of the air, and it is found by actual test that the air discharged through the exhaust openings 44 is at very low pressure, compared to the pressure of the air injected through the inlet openings or nozzles 38 and 39.

As one of the pockets in the rotor passes the inlet nozzle, a charge of air is forcibly injected into said pocket, impinging on the inner end thereof. This charge of air, while slight, nevertheless possesses a certain mass and tends to rebound after striking the inner wall of the rotor pocket. In the meantime, the rotor is advancing and the rebounding mass of air is driven into the next stationary pocket and in turn impinges against the inner end wall thereof. This rebounding or inertia action of the mass of air gives successive slight impulses to the rotor as the movable pocket passes successive stationary pockets. Each rebound or expansion of the charge of air in a stationary pocket gives a slight forward impulse to the rotor, there being an overbalance of pressure in the stator pocket due to the inertia of the air, the action being similar to that frequently seen in steam engine indicator cards where a loop or hook above boiler pressure is frequently formed.

The pockets of the stationary ring may be described as steps for the forward impulse of the rotor, giving successive footholds to the rebounding charges of air. The pressure in both the rotor and stator pockets gradually falls from the inlet to the discharge, due to the inertia action above described and also to seepage through the very slight gap necessary to provide a running fit.

While the mass of air in each rotor pocket is slight, there are eighteen such pockets in the rotor, which travels at about 20,000 turns per minute, making 360,000 rebounding charges per minute and the aggregate effect is substantial.

While the above statement of operation is believed to be correct, the actual behaviour of the air under pressure in such machines is more or less obscure and the successful operation of this air turbine may be due in part to other factors inherent in the construction of the device.

It will be seen that the pneumatic pressure at each side of the rotor 12 is balanced, preventing axial pressure on the bearings 14 and 15, and that the rotor 12 rotates freely in the center of the casing. Certain of the advantages of my improved turbine may be achieved in a single acting turbine, in which the rotor is provided with recesses, as 31, on one side only of the rotor, cooperating with a single series of pockets, as 37, on one side only of the casing, but this construction does not balance the pneumatic pressures, and I prefer the balanced construction shown in the drawings.

Having thus described my invention and the advantages thereof I do not wish to be limited to the details herein disclosed, otherwise than as set forth in the claims, but what I claim is:—

1. An air turbine comprising a casing, a rotor mounted therein, said rotor having a central web with an annular groove at each side thereof in its rim portion, a rotor plate mounted in each of said grooves and having a series of forwardly inclined recesses disposed about its periphery, with the inner end of each recess closed by said central web, means to inject air under pressure into said recesses successively, and means to thereafter release the compressed air from each recess.

2. An air turbine comprising a casing, a rotor mounted therein, said rotor having a central web and having two series of forwardly inclined recesses disposed about its periphery and at each side of said central web, each recess having a closed forward end, said casing having annular recesses in the wall portions adjacent the rim of said rotor and having a casing plate mounted in each of said annular recesses, said plates being provided with a circumferential series of rearwardly inclined expansion pockets aligned with said rotor recesses and each having its rear end closed by the casing wall, means to inject air under pressure into said rotor recesses successively, and means to discharge from each recess the compressed air remaining therein after said recess has completed a substantial part of a revolution beyond the inlet point.

3. An air turbine comprising a casing, a rotor mounted therein, said rotor having a central web with an annular groove at the side thereof in its rim portion, a rotor member having a circumferential series of forwardly inclined diagonal up-struck portions, mounted in said groove, said portions and groove together forming a series of forwardly inclined recesses disposed about the periphery of the rotor, with the inner end of each recess closed by said central web.

4. An air turbine comprising a casing, a rotor mounted therein, said rotor having a central web and having a series of recesses disposed about its periphery at the side of said web, said casing having an annular recess in the wall portion adjacent the rim of said rotor and having a casing plate provided with a circumferential series of rearwardly inclined up-struck portions, mounted in said annular recess, said portion, and annular recess together forming a series of rearwardly inclined pockets aligned with said rotor recesses and each pocket having its inner end closed by the casing wall.

5. An air turbine comprising a casing, a rotor mounted therein, said rotor having a central web with an annular groove at the side thereof in its rim portion, a rotor member having a circumferential series of forwardly inclined diagonal up-struck portions, mounted in said groove, said portions and groove together forming a series of forwardly inclined recesses disposed about the periphery of the rotor, with the inner end of each recess closed by said central web, said casing having an annular recess in the wall portion adjacent the rim of said rotor and having a casing plate provided with a circumferential series of rearwardly inclined up-struck portions, mounted in said annular recess, said portions and annular recess together forming a series of rearwardly inclined pockets aligned with said rotor recesses and each pocket having its inner end closed by the casing wall.

6. An air turbine comprising a casing, a rotor mounted therein, said rotor having a central web and having two series of forwardly inclined recesses disposed about its periphery and at each side of said central web, each recess having a closed inner end, said casing having an inner wall portion at each side of said rotor and closely adjacent thereto, and each wall portion having spaced inlet and exhaust openings and having a series of rearwardly inclined stationary pockets between said inlet and exhaust openings, said stationary pockets being intermittently aligned with said rotor recesses as the rotor rotates and each stationary pocket being closed at its inner end and being of substantially the same size as any one of said rotor pockets.

In testimony whereof I have hereunto affixed my signature.

MARK H. DAMERELL.